United States Patent
Uehara

(10) Patent No.: US 6,595,818 B2
(45) Date of Patent: Jul. 22, 2003

(54) METHOD OF MANUFACTURING ELECTRODE FOR PLUG

(75) Inventor: Koji Uehara, Mie-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/047,113

(22) Filed: Jan. 17, 2002

(65) Prior Publication Data

US 2002/0092835 A1 Jul. 18, 2002

(30) Foreign Application Priority Data

Jan. 18, 2001 (JP) .......................... 2001-10675

(51) Int. Cl.[7] .............................................. H01T 21/02
(52) U.S. Cl. ......................................................... 445/7
(58) Field of Search ..................... 445/7, 4; 313/140, 313/141, 143

(56) References Cited

U.S. PATENT DOCUMENTS

| | | | | |
|---|---|---|---|---|
| 5,320,569 A | * | 6/1994 | Oshima et al. ................ | 445/7 |
| 5,440,198 A | * | 8/1995 | Oshima et al. ................ | 445/7 |
| 6,064,144 A | * | 5/2000 | Knoll et al. .................... | 445/7 |
| 6,071,163 A | * | 6/2000 | Chang et al. .................. | 445/7 |
| 6,078,129 A | * | 6/2000 | Gotou et al. ................... | 445/7 |

FOREIGN PATENT DOCUMENTS

| | | |
|---|---|---|
| JP | 6-45050 | 2/1994 |
| JP | 6-188062 | 7/1994 |

* cited by examiner

*Primary Examiner*—Gary Paumen
(74) *Attorney, Agent, or Firm*—Nixon & Vanderhye P.C.

(57) ABSTRACT

A method of manufacturing an electrode for the use of a spark plus is provided, in which a laser welding process is adopted. In the laser welding process, a tip (2a) is laser-welded to a center electrode (2) of a spark plug (1) at N (e.g., N=8) spots on the tip (2a). Practically, two laser radiation apparatuses (10, 11) are disposed around the tip (2a) at two positions mutually shifted by an angle of "180–360/N (=135 degrees)." Laser beams are radiated by the two radiation apparatuses (10, 11) so that a pair of selected two spots are simultaneously laser-welded (i.e., one welding process). When an even-numbered time of welding process is performed, two spots to be welded are shifted from the last two spots laser-welded in the last odd-numbered time of welding process, and welded simultaneously by the two laser beams.

8 Claims, 4 Drawing Sheets

METHOD OF MANUFACTURING ELECTRODE FOR PLUG

BACKGROUND OF THE INVENTION

The present invention relates to a method of manufacturing an electrode used for plugs, and in particular, to a manufacturing method of an electrode applied to a spark plug equipped with two electrodes (i.e., a center electrode and an earth electrode) arranged face to face with a predetermined gap therebetween and on both or one of which a noble metal tip is laser-welded at a plurality of spots to the electrode(s).

There is provided a spark plug that has a center electrode on which a tip made from an iridium alloy is welded. Practically, the tip welded on the electrode by radiating a laser beam onto a plurality of spots (for example, 8 spots) on the root of the tip (i.e., on the area located between the center electrode and the tip).

Conventionally, the welding of the tip to the center electrode is carried out spot by spot, which leads to the problem that it takes much welding man-hours, encountering the problem that it is difficult to reduce manufacturing cost of the spark plug.

Further, at each spot that has received the radiation of a laser beam, both of the tip and the electrode partly become melted. Thus, during the radiation of a laser beam (that is, during the laser welding), it is easier that the tip tilts to the electrode on account of a slight disturbance (external force), being apt to cause defective tips.

To solve this problem about the tilt of the tip, the solution is to reduce the output of the laser beam. However, reducing the output will not enable each spot to be welded of the tip and electrode to melt sufficiently in a shorter time, increasing the man-hours. In addition, the possibility that the welding results in failure is raised.

SUMMARY OF THE INVENTION

An object of the present invention is to, with due consideration of the above drawbacks, provide a manufacturing method which is able to reduce a manufacturing cost of a spark plug with reduced man-hours (time required for the manufacture).

In order to realize the above object, as one embodiment, the present invention provides a method of manufacturing a plug electrode applied to a spark plug equipped with two electrodes (2, 3) disposed face to face with a specified gap therebetween, a noble metal tip (2a) being laser-welded at a plurality of spots on at least one of the two electrodes, comprising the steps of: placing at least two laser radiation apparatuses of which axes of radiated laser beams are directed in an indirect face-to-face manner at the tip (2a); and driving the two or more laser radiation apparatuses so that at least two of the laser beams are radiated to at least two of the spots to be welded at a substantially simultaneous timing.

Thus, two spots are subject to simultaneously performed laser welding. Compared to the conventional, the laser welding process can be reduced to approximately half of its process.

In addition, the two laser radiation apparatuses (10, 11) are disposed so that the axes of their laser beams cross at the tip (2a) and engage in the simultaneous laser welding of two spots on the tip (2a) and electrode (2). Therefore, if the focus of one of the two laser radiation apparatuses is moved in any way, there is no fear that the laser beam radiated from the moved apparatus impinges onto the other apparatus.

Thus, with the damage of the laser radiation apparatuses prevented without fail, the laser welding process can be shortened to approximately half of its conventional process.

As a second embodiment, the present invention provides a method of manufacturing a plug electrode applied to a spark plug equipped with two electrodes (2, 3) disposed face to face with a specified gap therebetween, a noble metal tip (2a) being laser-welded at a plurality of spots on at least one of the two electrodes, comprising the steps of: placing at least two laser radiation apparatuses (10, 11) disposed at positions mutually shifted by an angular amount of "(180–360/N)±10" degrees (N is the number of welded spots) around the tip (2a); and performing welding by using the two or more laser radiation apparatuses (10, 11) so that at least two of the laser beams are radiated to at least two of the spots to be welded at a substantially simultaneous timing.

Like the first embodiment, two spots are also subject to simultaneously performed laser welding. Compared to the conventional, the laser welding process can be reduced to approximately half of its process.

In addition, two spots are subjected to the simultaneous welding by the two laser radiation apparatuses (10, 11) disposed at positions mutually shifted by an angular amount of "(180–360/N)±10" degrees (N is the number of welded spots) around the tip (2a). Thus, like the first embodiment, if the focus of one of the two laser radiation apparatuses is moved in any way, there is no fear that the laser beam radiated from the moved apparatus impinges onto the other apparatus.

Thus, with the damage of the laser radiation apparatuses prevented without fail, the laser welding process can be shortened to approximately half of its conventional process.

In the first and second examples, it is preferred that the welding performing step includes a step of performing, in an even-numbered time of welding process, the welding at a spot different from the last spot subject to the welding during an odd-numbered time of welding process following the even-numbered time of welding process, in cases where one process of welding is defined as a process in which the two laser radiation apparatuses (10, 11) engage in simultaneous laser welding at the two spots.

This configuration makes it possible to prevent an unbalance in the distortion in welding, because the welding is carried out such that paired two welded spots constitute the point symmetry of arrangements as a whole. Accordingly, the tip (2a) is prevented from tilting.

As a third embodiment of the present invention, there is provided a method of manufacturing a plug electrode applied to a spark plug equipped with a center electrode (2) and an earth electrode (3) disposed face to face with a specified gap therebetween, a noble metal tip (2a) being laser-welded at a plurality of spots to the center electrode (2), comprising the steps of: placing two laser radiation apparatuses disposed at positions mutually shifted by a specified amount of angle around the tip (2a); and causing the two laser radiation apparatuses (10, 11) to radiate a laser beam respectively toward each spot for laser welding on the basis of a sequence including a period of laser non-radiated time between welding processes in each of which the two laser radiation apparatuses engage in the simultaneous laser welding at the two spots, the period of laser non-radiated time being a period of time to allow only a fraction defective of 0.5 percents or less in cases where an axial center of the tip (2a) tilts to an axial center of the center electrode (2) by an amount of more than 3 degrees is defined as a defective.

Accordingly, with a fraction defective of 0.5 percents or less maintained, the laser welding process can be reduced to approximately half of its conventional process, because two spots on the tip are also subject to simultaneously performed laser welding.

In the third embodiment, it is preferred that the period of laser non-radiated time existing between a first welding process and a second welding process is shorter than the periods of laser non-radiated time existing between processes following the second welding process. This makes it possible to reduce the fraction defective to a smaller amount.

More preferably, the period of laser non-radiated time is assigned to a period of time during which welded parts of the tip (2a) are cooled. This eliminates temperature at the welded spots from rising excessively, thus a tilt of the tip (2a) being prevented. Preferably, the cooling is self-cooling based on air-cooling.

The references enclosed in parentheses in the above constructions correspond to constituents detailed in the following embodiments, but it is not meant that those references do not limit the scope of the present invention.

PREFERRED EMBODIMENTS OF THE INVENTION

With reference to the accompanying drawings, preferred embodiments of the present invention will now be described.

Referring to FIGS. 1 to 4, a first embodiment of the present invention will now be described. The first embodiment provides a spark plug for internal combustion engines, to which a manufacturing method according to the present invention is applied.

Figure 1:
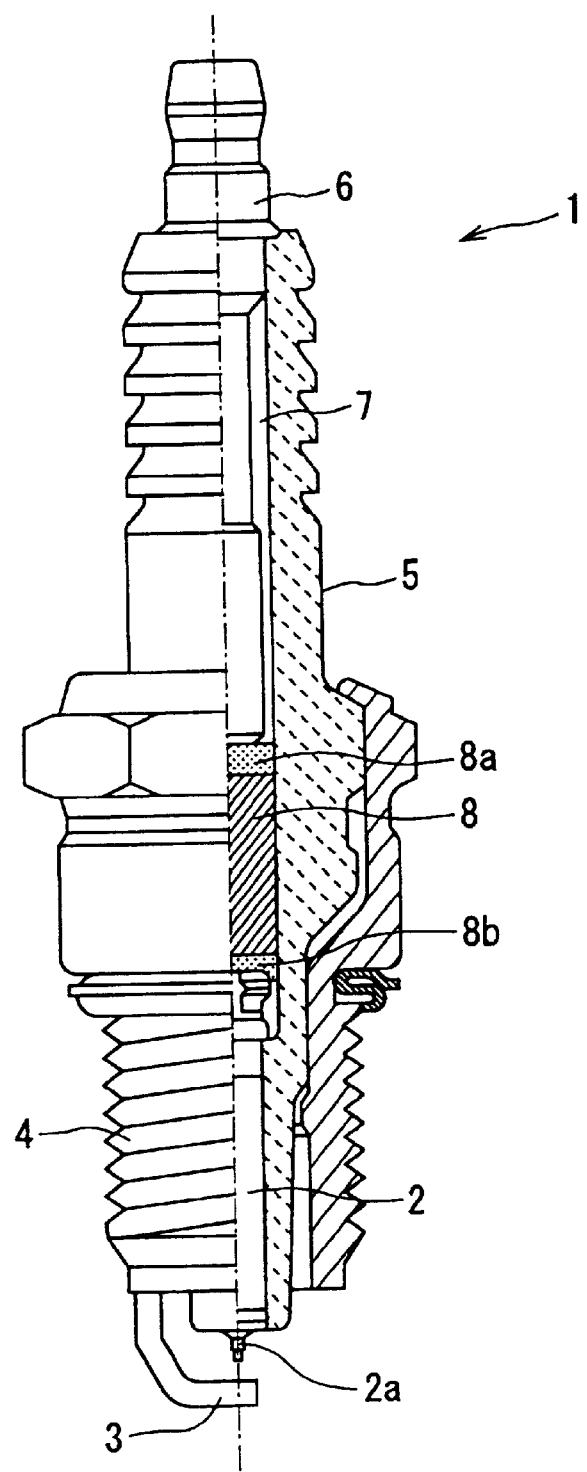
FIG. 1 is half a section of a spark plug in which the present invention is practiced.

FIG. 1 shows a longitudinal cross section of a spark plug 1 used for an automotive internal combustion engine.

The spark plug 1 is provided with a center electrode 2, an earth electrode 3, a housing 4 practically cylindrical in shape, an insulator 5, a metal stem 7 provided with a terminal 6, a resistor 8, and other components. The earth electrode 3 is welded to the housing 4. The insulator 5 is made of an electric insulator such as alumina ceramics ($Al_2O_3$). The resistor 8 is placed within the insulator 5 so as to be located between the stem 7 and the center electrode 2 in the insulator 5 and has a predetermined value of electric resistance. An electric spark is generated between the center electrode 2 and the earth electrode 3.

The center electrode 2 is a cylindrical member of which inner material is made from metal materials with high heat conductivity such as Cu and of which outer material is made from metal materials with high thermal and corrosion resistance such as nickel-based alloy. On the tip of the center electrode 2, a noble metal tip 2a (in the present embodiment, the metal is iridium) is weld by laser to be exposed to the earth electrode 3 from the insulator 5.

A laser is radiated on a base portion of the tip 2a at 8 spots, so that the tip 2a is weld to the center electrode 2. The center electrode 2 with the tip 2a weld thereon is hereinafter referred to as a "plug electrode."

In this embodiment, 8 spots on the base portion of the tip 2a (that is, connected parts between the center electrode 2 and the tip 2a) are welded by radiating laser beams onto the spots, so that the tip 2a is welded to the center electrode 2. The center electrode 2 with the tip 2a weld thereon is hereinafter referred to as a "plug electrode."

The earth electrode 3, made from a nickel-based alloy whose main component is nickel, is curved by about 90 degrees (almost in an L-form). One of its end portions is welded to the housing 4, while the other end portion is spaced apart from the center electrode 2 (i.e., the tip 2a) with a predetermined spacing therebetween.

The resistor 8 is a cylindrically shaped member made from resistive material powder of which main component is glass mixed with carbon powder, and sintered into a cylindrical form in a furnace. Glass sealing layers 8a and 8b made from conductive glass are formed at both longitudinal ends of the resistor 8, preventing a communication between the center electrode 2 (the inside of a combustion chamber) and the terminal 6 (the outside of the combustion chamber).

After the resistor 8 is formed within the insulator 5, the housing 4 is partly caulked (i.e., plastic-deformed) so that the housing is mechanically secured to the insulator 5.

Figure 2:
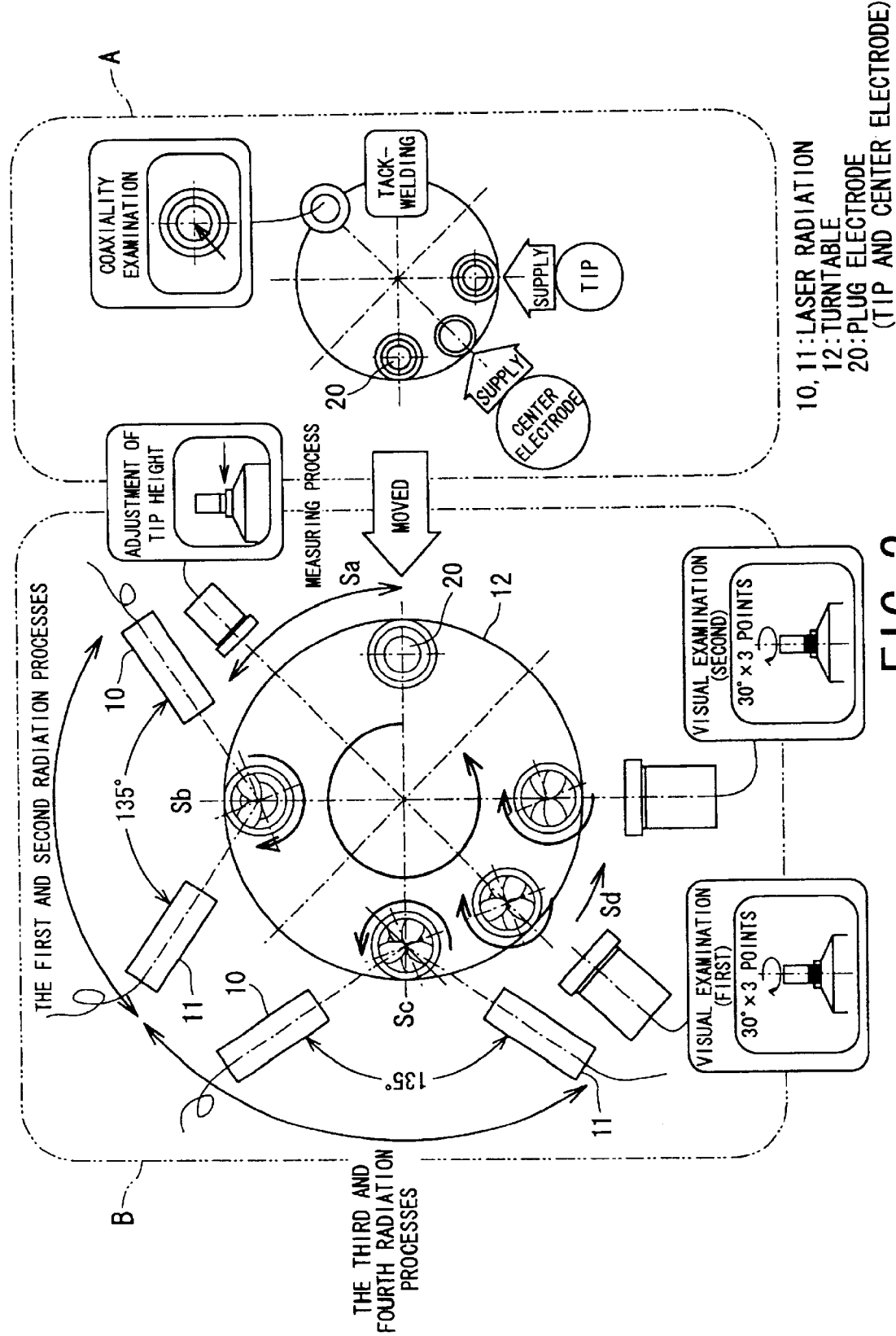
FIG. 2 illustrates a manufacturing method of a plug electrode according to an embodiment of the present invention.

FIG. 2 is an illustration for explaining a manufacturing method of the plug electrode (in other words, a plug electrode manufacturing apparatus) according to the present embodiment. In FIG. 2, a reference "A" shows a tack-welding process and a reference "B" shows a laser-welding process (laser welding).

In the tack-welding process, the tip 2a is tack-weld onto the center electrode 2 by welding means such as electric resistance welding. Then it is examined whether or not a coaxiality of the tip 2a to the center electrode 2 is within a predetermined value, and standing marks are forwarded to the subsequent laser-welding process.

In the laser-welding process, two laser radiation apparatuses 10 and 11 are used to radiate laser beams onto two spots at the same time. The two laser radiation apparatuses 10 and 11 are disposed at positions mutually shifted by an amount of 180–360/N degrees (in the present embodiment, 135 degrees) around the tip 2a, on condition that the tip 2a is welded on the center electrode 2 at N-piece welding spots (in the present embodiment, N=8 spots).

In this embodiment, the process of laser welding carried out by the two laser radiation apparatuses 10 and 11 driven simultaneously as one group is defined as one process. When using such definition of the process, the welding carried out in this embodiment can be explained such that, on completion of an odd-numbered time of welding process, the next process, that is, an even-numbered time of welding process is launched immediately, in which the two spots to be welded are shifted by an amount of 180 degrees from the last positions of the two spots.

Practically the tack-weld plug electrode 20 is placed on a turntable 12 for the laser welding. Then the position (i.e., height) of the tip 2a is detected by a laser measuring apparatus to adjust the focus position of the laser beam radiated by the laser radiation apparatus 10 (measuring process; refer to a reference Sa).

Laser beams are then radiated simultaneously from the two radiation apparatuses 10 and 11 arranged an angle of 135 degrees apart to each other around the tip 2a (that is, the first radiation process; refer to a reference Sb). Then, the plug electrode 20 (i.e., work), which has been welded in the first welding process, is rotated 180 degrees for 1.3 seconds at the same position. The welding is then performed on new two spots shifted by an angular amount of 180 degrees from the last spots at which the first welding process has been made by radiating the laser beams. This is the second radiation process (refer to a reference Sb).

Between the first and second radiation processes, there is an interval during which no laser beams are radiated. Hereinafter the interval is referred to as a "first idle time".

After the second radiation process, the turntable 12 is rotated 90 degrees for approximately 3 seconds, and the two laser radiation apparatuses 10 and 11 are driven to radiate the laser beams at 2 spots at the same time (that is, the third welding process; refer to a reference Sc). Thus, during the third welding process, new two spots shifted 90 degrees from the two spots welded by the laser beams during the second radiation process are subject to the simultaneous laser welding involving new radiation of laser beams.

The plug electrode 20 (work) welded during the third radiation process then undergoes the rotation of 180 degrees at the same position, which lasts 1.5 seconds. After this rotation, the welding (i.e., the fourth radiation process; refer to a reference Sc) is done through the radiation of laser beams onto new two spots different in position 180 degrees from the last two spots onto which the laser beams were radiated during the third radiation process.

Hereinafter, the time interval that is present between the second and third radiation processes, during which time no laser beams are radiated, is referred to as the "second idle time." Likewise, the time interval with no radiation of laser beams between the third and fourth radiation processes is referred to as "the third idle time."

After the fourth radiation process, a visual examination is carried out, before proceeding to an assembling process placed as the next process (refer to a reference Sd).

The present manufacturing method of the plug electrode according to the present embodiment will now be described in terms of its characteristics (operations and advantages).

In the present embodiment, the simultaneous welding at the two spots enables the laser welding process to be completed in approximately half of the welding man-hour required for the conventional technique.

The tip 2a is so small (in the present embodiment, 0.4 mm in diameter) that the two paired laser radiation apparatuses 10 and 11 disposed straightly face to face with the tip 2a therebetween (i.e., an angular width between the two radiation apparatuses is 180 degrees) may lead to a difficulty. Specifically, in such an arrangement, if the focus of one of the two laser radiation apparatuses is moved slightly, the laser beam radiated from the shifted laser radiation apparatus may impinge onto the other one, resulting in that the other laser radiation apparatus may be damaged.

In contrast, in the present embodiment wherein N-piece (=8) welded spots are used for welding the tip 2a on the center electrode 2, the two laser radiation apparatuses 10 and 11 disposed at positions mutually shifted "180–360/N" degrees (=135 degrees) around the tip 2a are driven for simultaneous laser welding at the two spots. This means that the optical axes of the laser beams radiated from the two laser radiation apparatuses 10 and 11 always cross at the tip 2a.

Therefore, if the focus of one of the two laser radiation apparatuses is moved in any way, there is no fear that the laser beam radiated from the moved apparatus impinges onto the other apparatus. Thus, with the damage of the laser radiation apparatuses prevented without fail, the laser welding process can be shortened to approximately half of its process in comparison with the conventional.

As described before, radiation of a laser causes the welded spots of the tip 2a and center electrode 2 to be melted, with the result that a slight disturbance (external force) tends to cause a tilt of the tip 2a to the electrode. Considering this drawback, the present embodiment has the idle times between the two radiation processes, during which no laser beams are radiated but air-cooling naturally cools the tip 2a. This cooling is able to prevent an excessive temperature rise at each welded spot of the tip 2a and the center electrode 2.

In the present embodiment, on condition that the tip 2a of which axial center is tilted 3 or more degrees to the axial center of the center electrode 2 is categorized into defectives, the first to third idle times are determined so that the fraction defective becomes 0.5 percents or less.

Provided that the first to third idle times are the same in duration, a later radiation process will cause a higher temperature at welded spots of the chip 2a and the center electrode 2. Accordingly it is easier for the tip 2a to tilt to the electrode.

Figure 3:
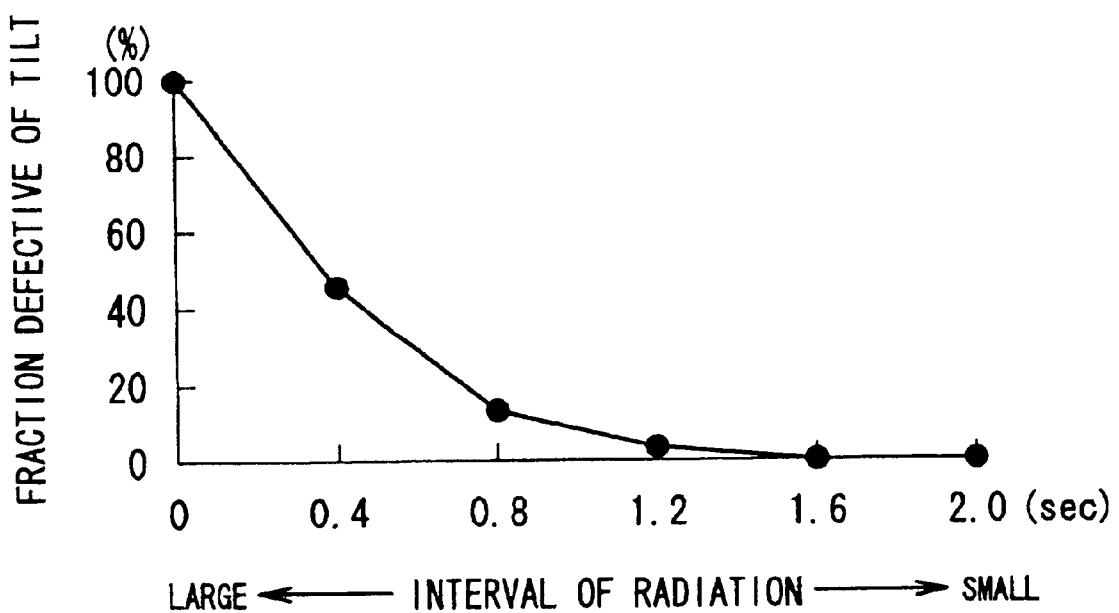
FIG. 3 is a graph showing the relationship between the fraction defective of the tilt and the third idle time.

The present embodiment considers this fact, and shortens the first idle time compared to the second and third idle times. This prevents temperature at connected parts between the tip 2a and the center electrode 2 from rising excessively, suppressing tilts of the chip 2a. FIG. 3 depicts a graph showing the fraction defective collected when the third idle time is changed as a parameter. It is clearly understood from this graph that the longer the third idle time, the smaller the fraction defective.

Additionally, the present embodiment adopts the second idle time longer than the third idle time. The reason is that the first to fourth processes are carried out for the work laid on the turntable 12 and the visual examination is done after the fourth radiation process, so priority is given to the time necessary for the visual examination.

This priority is derived from the facts that the time required for the visual examination is longer than the second idle time necessary for non-radiation itself of laser beams and the fraction defective becomes smaller as the second idle time becomes longer, as can be read from FIG. 3. Hence giving priority to the visual examination will not cause any actual problem.

If there is a manufacturing system in which the second idle time is not restricted to the time necessary for the visual examination, the relationship of "the first idle time<the second idle time<the third idle time" will be realized.

Figure 4:
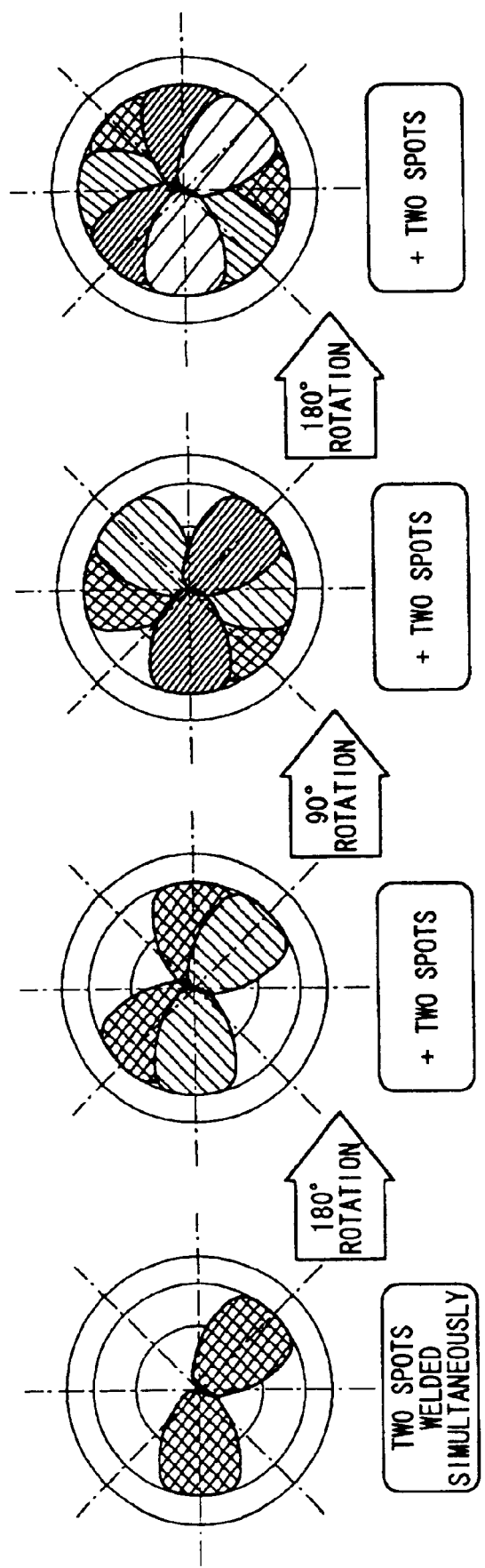
FIG. 4 illustrates a laser welding process in the manufacturing method of the plug electrode.

In cases where one process of welding is defined as a process in which one group consisting of the two laser radiation apparatuses 10 and 11 engage in simultaneous laser welding at two spots, welding during the an even-numbered time of welding process following the last odd-numbered time of welding process is carried out at spots shifted 180 degrees from the last spots welded during the last odd-numbered time of welding process. As shown in FIG. 4, the welding is performed in a point symmetry with the two spots grouped as one, distortion due the welding (welding distortion) is avoided from occurring in an unbalance manner. Therefore, the tip 2a can be suppressed from being tilted.

(Other Embodiments)

Although the foregoing embodiment has adopts 8 spots (N=8) to be welded, the present invention is not limited to this number, but the spots N to be welded may be any natural number of 2 or more.

In the foregoing embodiment, the two spots have been welded at the same time, but it is enough for the present invention that at least two spots are welded simultaneously. Therefore, the welding based on the present invention includes simultaneous welding at three or more spots.

Further, materials available to the tip 2a are not restricted to iridium, but the materials include other noble metals, such as platinum and platinum-based alloys.

The size of the tip 2a can be for example 0.4 to 1 mm in diameter, and not limited to the size adopted by the foregoing embodiment.

Though the foregoing embodiment has utilized the idle times to perform the self-cooling on air-cooling, the present invention is not confined to such cooling manners. As an alternative way, forced air-cooling using a fan, oil-cooling, or water-cooling can be adopted.

Furthermore, the angular width between the two laser radiation apparatuses is not limited to values obtained from "180–360/N degrees" described before. Any angular width is enough, provided that the optical axes of laser beams radiated from two laser radiation apparatuses cross at the tip 2a at any crossing angle.

Although the description above contains many specificities, these should not be construed as limiting the scope of the invention but as merely providing illustrations of some of the presently preferred embodiments of the present invention. Thus the scope of the present invention should be determined by the appended claims and their equivalents.

What is claimed is:

1. A method of manufacturing a plug electrode applied to a spark plug equipped with two electrodes disposed face to face with a specified gap therebetween, a noble metal tip being laser-welded at a plurality of spots on at least one of the two electrodes, said method comprising:

placing at least two laser radiation apparatuses of which axes of radiated laser beams are directed in an indirect face-to-face manner at the tip; and driving the two or more laser radiation apparatuses so that at least two of the laser beams are radiated to at least two of the spots to be welded at a substantially simultaneous timing.

2. The method of claim 1, wherein, in an even-numbered time of the welding process, welding is performed at a spot different from the last spot subjected to welding during an odd-numbered time of the welding process, in cases where welding is defined as a process in which the two laser radiation apparatuses engage in simultaneous laser welding at the two spots.

3. A method of manufacturing a plug electrode applied to a spark plug equipped with two electrodes disposed face to face with a specified gap therebetween, a noble metal tip being laser-welded at a plurality of spots on at least one of the two electrodes, said method comprising;

placing at least two laser radiation apparatuses disposed at positions mutually shifted by an angular amount of "(180–360/N)±10" degrees (N is the number of welded spots) around the tip; and performing welding by using the two or more laser radiation apparatuses so that at least two of the laser beams are radiated to at least two of the spots to be welded at a substantially simultaneous timing.

4. The method of claim 3, wherein, in an even-numbered time of the welding process, welding is performed at a spot different from the last spot subjected to the welding during an odd-numbered time of the welding process, in cases where welding is defined as a process in which the two laser radiation apparatuses engage in simultaneous laser welding at the two spots.

5. A method of manufacturing a plug electrode applied to a spark plug equipped with a center electrode and an earth electrode disposed face to face with a specified gap therebetween, a noble metal tip being laser-welded at a plurality of spots to the center electrode, said method comprising:

placing two laser radiation apparatuses disposed at positions mutually shifted by a specified amount of angle around the tip; and causing the two laser radiation apparatuses to radiate a laser beam respectively toward each spot for laser welding on the basis of a sequence including a period of laser non-radiated time between welding processes in each of which the two laser radiation apparatuses engage in simultaneous laser welding at the two spots, the period of laser non-radiated time being a period of time to allow only a defective fraction of 0.5 percents or less in cases where an axial center of the tip tilts to an axial center of the center electrode by an amount of more than 3 degrees is defined as being defective.

6. The method of claim 5, wherein the period of laser non-radiated time existing between a first welding process and a second welding process is shorter than the periods of laser non-radiated time existing between welding processes following the second welding process.

7. The method of claim 6, wherein the period of laser non-radiated time is assigned to a period of time during which welded parts of the tip are cooled.

8. The method of claim 7, wherein the cooling is self-cooling based on air-cooling.

* * * * *